(12) United States Patent
Levinshtein et al.

(10) Patent No.: US 10,740,649 B2
(45) Date of Patent: Aug. 11, 2020

(54) OBJECT ATTITUDE DETECTION DEVICE, CONTROL DEVICE, AND ROBOT SYSTEM

(71) Applicant: Seiko Epson Corporation, Tokyo (JP)

(72) Inventors: Alex Levinshtein, Thornhill (CA);
Joseph Chitai Lam, Toronto (CA);
Mikhail Brusnitsyn, Toronto (CA);
Guoyi Fu, Richmond Hill (CA)

(73) Assignee: Seiko Epson Corporation (JP)

( * ) Notice: Subject to any disclaimer, the term of this patent is extended or adjusted under 35 U.S.C. 154(b) by 214 days.

(21) Appl. No.: 15/935,685

(22) Filed: Mar. 26, 2018

(65) Prior Publication Data

US 2018/0285684 A1 Oct. 4, 2018

(30) Foreign Application Priority Data

Mar. 29, 2017 (JP) ................................. 2017-064549

(51) Int. Cl.
*G06K 9/62* (2006.01)
*B25J 9/16* (2006.01)
*G06K 9/32* (2006.01)

(52) U.S. Cl.
CPC ............ *G06K 9/6202* (2013.01); *B25J 9/163* (2013.01); *B25J 9/1697* (2013.01); *G06K 9/6215* (2013.01); *G05B 2219/40563* (2013.01); *G06K 9/3241* (2013.01); *Y10S 901/03* (2013.01); *Y10S 901/47* (2013.01)

(58) Field of Classification Search
CPC ............ G06K 9/4604; G06K 9/00671; G06K 9/6215; G06K 9/6202; G06K 9/3241; G06F 16/51; G06F 16/583; G05B 2219/40563

USPC .......................................................... 382/153
See application file for complete search history.

(56) References Cited

U.S. PATENT DOCUMENTS

| 5,742,701 | A * | 4/1998 | Takano ..................... G06T 7/73 348/95 |
| 9,177,225 | B1 * | 11/2015 | Cordova-Diba .......... G06T 5/00 |
| 9,424,470 | B1 * | 8/2016 | Hinterstoisser .... G06K 9/00664 |
| 2010/0202657 | A1 * | 8/2010 | Salgian ............. G06K 9/00369 382/103 |

(Continued)

OTHER PUBLICATIONS

S. Hinterstoisser et al., "Gradient Response Maps for Real-Time Detection of Texture-Less Objects", IEEE Transactions on Pattern Analysis and Machine Intelligence, vol. 34, Issue 5, pp. 876-888 (2012).

*Primary Examiner* — Ali Bayat
(74) *Attorney, Agent, or Firm* — Harness, Dickey & Pierce, P.L.C.

(57) ABSTRACT

An object attitude detection device includes a pick-up image acquisition unit, a template image acquisition unit, and an attitude decision unit. The pick-up image acquisition unit acquires a picked-up image of an object. The template image acquisition unit acquires a template image for each attitude of the object. The attitude decision unit decides an attitude of the object based on the template image having pixels. In the pixels, a distance between pixels forming a contour in the picked-up image and pixels forming a contour of the template image is shorter than a first threshold. Further, a degree of similarity between a gradient of the pixels forming the contour in the picked-up image and a gradient of the pixels forming the contour of the template image is higher than a second threshold.

20 Claims, 9 Drawing Sheets

(56) References Cited

U.S. PATENT DOCUMENTS

| | | | | |
|---|---|---|---|---|
| 2015/0329217 | A1* | 11/2015 | Kirk | B64D 45/00 |
| | | | | 701/301 |
| 2017/0348854 | A1* | 12/2017 | Oleynik | B25J 9/1605 |
| 2018/0172429 | A1* | 6/2018 | Haverkamp | G01B 11/24 |
| 2019/0126487 | A1* | 5/2019 | Benaim | B25J 9/1697 |

* cited by examiner

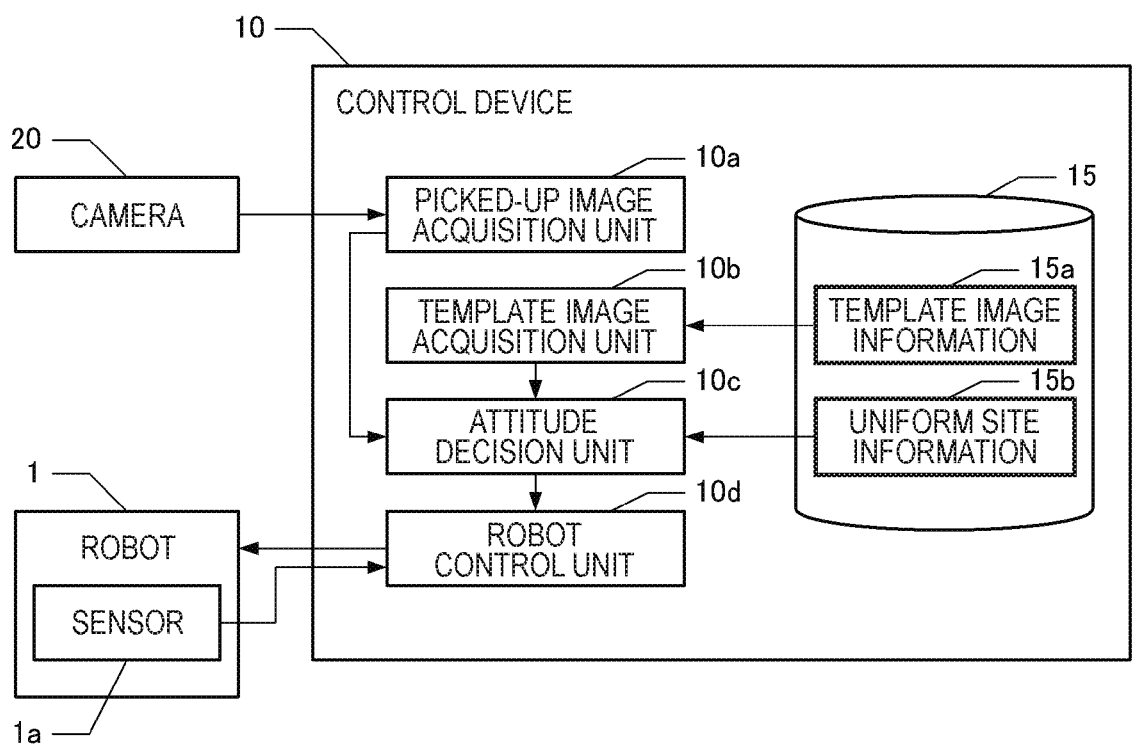
FIG. 2
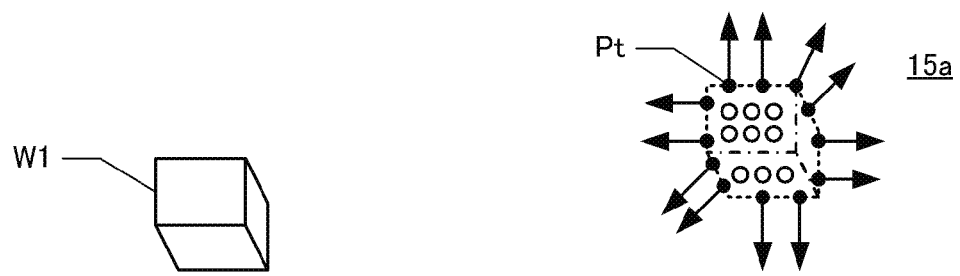
FIG. 3
FIG. 4

OBJECT ATTITUDE DETECTION DEVICE, CONTROL DEVICE, AND ROBOT SYSTEM

BACKGROUND

1. Technical Field

The present invention relates to an object attitude (pose) detection device, a control device, and a robot system.

2. Related Art

According to the related art, a technique of detecting an object by comparing a picked-up image of the object with a template image is known. For example, Stefan Hinterstoisser, et al., "Gradient Response Maps for Real-Time Detection of Texture-Less Objects", IEEE TRANSACTIONS ON PATTERN ANALYSIS AND MACHINE INTELLIGENCE, 2012, Volume 34, Issue 5, pages 876-888, discloses a technique of detecting an object by comparing the gradients of the contours of the object and a template.

Various techniques are known as techniques of detecting an object by template matching as described above. However, with the related art, there are cases where an object cannot be properly detected by template matching.

SUMMARY

An advantage of some aspects of the invention is that the possibility of being able to properly detect an object is improved.

An object attitude detection device according to an aspect of the invention includes: a picked-up image acquisition unit which acquires a picked-up image of an object; a template image acquisition unit which acquires a template image for each attitude of the object; and an attitude decision unit which decides an attitude of the object, based on the template image such that a distance between pixels forming a contour in the picked-up image and pixels forming a contour of the template image is shorter than a first threshold and that a degree of similarity between a gradient of the pixels forming the contour in the picked-up image and a gradient of the pixels forming the contour of the template image is higher than a second threshold.

That is, in the object attitude detection device, focus is placed on the pixels forming the contour in the picked-up image of the object and the pixels forming the contour of the template image. In the object attitude detection device, if the distance between the pixels of the contour in the picked-up image and the pixels of the contour of the template image is short and the gradients of these pixels are similar, the contour formed in the picked-up image is regarded as the contour of the object and the attitude of the object picked up in the image is decided based on the template image. With this configuration, the possibility of occurrence of detection error can be reduced and the possibility of being able to properly detect an object can be improved.

The second threshold may be configured to be smaller as a curvature of the contour of the template image becomes greater. With this configuration, the allowable range of gradient difference is increased. Therefore, the possibility of regarding the state where an object can be regarded as having been detected, as a non-detected state, can be reduced.

The attitude decision unit may be configured to decide the attitude of the object, based on the template image such that a degree of coincidence between a uniform site in the contour formed in the picked-up image and a uniform site in the contour of the template image is higher than a third threshold. With this configuration, the attitude of an object can be decided based on features of the surface of the object, and the possibility of being able to properly detecting an object can be improved.

The uniform site may be configured of pixels having a minimum distance to an edge equal to or greater than a minimum reference value. With this configuration, a uniform site can be easily extracted from an image.

The attitude decision unit may be configured to change a plurality of positions of the template image, acquire a degree of association between each of the template images after the change and the picked-up image, and decide the attitude of the object, based on the template image such that a degree of steepness of distribution of the degree of association is higher than a fourth threshold. With this configuration, after an object similar to a template image is specified in a picked-up image, whether the template image is slightly misaligned from the image of the object or not is verified. Thus, the possibility of being able to properly detect an object can be improved.

The degree of association may be configured to be a degree of similarity between the gradient of the pixels forming the contour in the picked-up image and the gradient of the pixels forming the contour of the template image. With this configuration, the attitude of an object can be detected, based on the degree of association defined by features of an image of the object and a template image.

The degree of association may be configured to be a degree of correlation between a value calculated based on the picked-up image and a value calculated based on the template image. With this configuration, the attitude of an object can be detected based on various kinds of information that can provide association between an image of the object in a picked-up image and a template image.

BRIEF DESCRIPTION OF THE DRAWINGS

The invention will be described with reference to the accompanying drawings, wherein like numbers reference like elements.

FIG. 2 is a block diagram of a control device.

FIG. 3 shows an example of a three-dimensional model of an object.

FIG. 4 shows an example of a template image.

DESCRIPTION OF EXEMPLARY EMBODIMENTS

Figure 1:
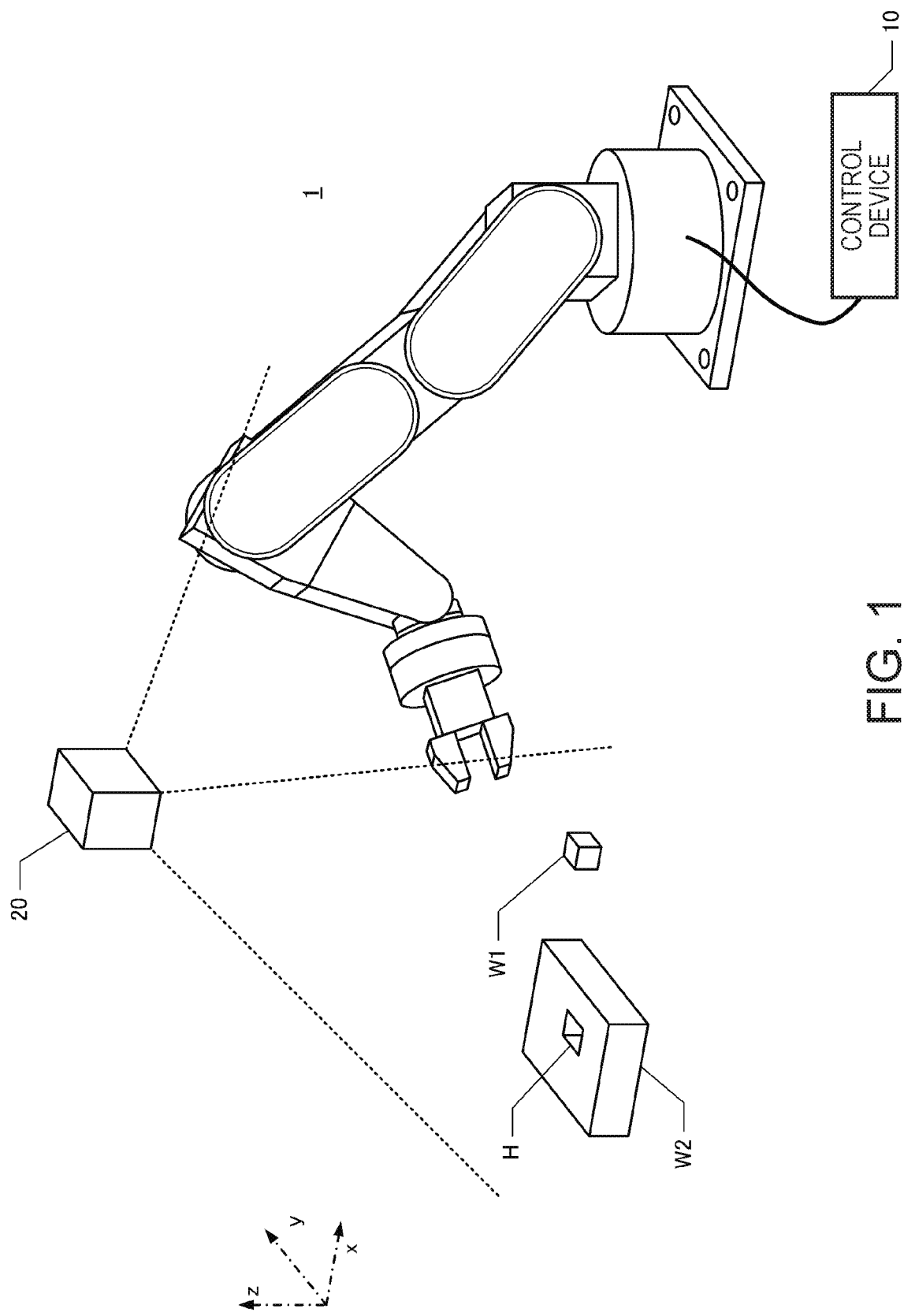
FIG. 1 is a perspective view showing an embodiment of the invention.

Hereinafter, an embodiment of the invention will be described in the following order, referring to the accompanying drawings. In the illustrations, corresponding components are denoted by the same reference signs and duplicate explanation is omitted.
(1) Configuration of robot system
(2) Configuration of control device
(3) Object attitude detection processing
(4) Attitude candidate acquisition processing
(5) Verification processing based on uniformity
(6) Verification processing based on degree of association
(7) Other embodiments (1) Configuration of Robot System FIG. 1 is a perspective view showing a robot controlled by a control device according to an embodiment of the invention. A robot system as an example of the invention includes a robot 1, a control device 10, and a camera 20, as shown in FIG. 1. The robot 1 is a 6-axis robot having an end effector.

The robot 1 is controlled by the control device 10. The control device 10 is connected to the robot 1 in such a way as to be able to communicate via a cable. The components of the control device 10 may be provided in the robot 1. Also, the control device 10 may be configured of a plurality of devices. The control device 10 can be connected to a teaching device, not illustrated, via a cable or via wireless communication. The teaching device may be a dedicated computer or may be a general-purpose computer in which a program for teaching the robot 1 is installed. Moreover, the control device 10 and the teaching device may be configured as a single unit.

The robot 1 is a single-arm robot used with various end effectors installed on an arm. The robot 1 can place the end effector at an arbitrary position within a movement range and in an arbitrary attitude (angle) by driving the 6-axis arm. FIG. 1 shows an example in which the end effector is a gripper. In the work area of the robot 1, objects W1, W2 are illustrated. In this example, the robot 1 carries out the work of gripping the object W1 with the gripper and inserting the object W1 into a hole H in the object W2.

In the embodiment, the camera 20 is fixed above (vertically above) the movement range of the robot 1 so that the field of view includes the movement range of the robot 1. Thus, the camera 20 can pick up an image of the objects W1, W2. However, the position where the camera 20 is fixed is not limited to above the movement range. For example, the camera 20 may be attached to the robot 1. In the embodiment, the attitude of the object W1 is detected based on an image picked up by the camera 20, and the robot 1 operates and grips the object W1, based on the detected attitude.

In the robot 1, various coordinate systems are defined, such as a robot coordinate system that prescribes the position in the space where the robot 1 is fixed (orthogonal xyz coordinate system shown in FIG. 1), a camera coordinate system based on the camera 20 as a reference point, and a force control coordinate system that prescribes a force acting on the robot 1. The relationship between these coordinate systems is determined with respect to each other, and the coordinate systems can be converted to each other. In this specification, in order to simplify the description, the attitudes of the object W1 and the robot 1 are described using the robot coordinate system. In the specification, an attitude can include a position. For example, the attitude of the object W1 can be expressed by positions along the x axis, y axis and z axis on the xyz coordinate system as the robot coordinate system, and angles of rotation about the x-axis, y-axis and z-axis.

(2) Configuration of Control Device

FIG. 2 shows the configuration of the control device 10 for controlling the robot 1. The control device 10 has a program execution environment including a CPU, a ROM, and a RAM or the like, not illustrated, and a recording medium 15. By executing a program recorded in the ROM or the recording medium 15, the control device 10 executes various functions for controlling the robot 1.

In FIG. 2, the functions executed by the program are shown as a picked-up image acquisition unit 10a, a template image acquisition unit 10b, an attitude decision unit 10c, and a robot control unit 10d. The picked-up image acquisition unit 10a causes the control device 10 to execute the function of acquiring a picked-up image of an object. That is, by the function of the picked-up image acquisition unit 10a, the control device 10 controls the camera 20 to acquire a picked-up image and record the picked-up image in the RAM. Therefore, by controlling the camera 20 to acquire a picked-up image in the state where the field of view of the camera 20 includes at least the object W1, the control device 10 acquires a picked-up image of the object W1 as an attitude detection target.

The template image acquisition unit 10b causes the control device 10 to execute the function of acquiring a template image for each attitude of an object. That is, the control device 10 acquires a template image, based on template image information 15a recorded in the recording medium 15. In the embodiment, a template image is an image wherein a three-dimensional model of the object W1 is projected onto a two-dimensional plane (image pickup plane), and includes information showing a plurality of pixels forming a contour in this image and gradient vectors of these pixels.

FIG. 3 shows the state where the object W1 is seen from a specific direction. FIG. 4 shows the state where the object W1 is projected onto a two-dimensional plane. In FIG. 4, the contour of the projected object W1 is indicated by a dashed line and lines existing in the contour (projected lines of edges of the cube) are indicated by dot-dashed lines. The white dots in the contour are geometric figures used in the later description and are not of the projected image of the object W1. Pixels forming the contour of the object W1 are indicated by black dots and the gradient vectors of these pixels are indicated by arrows. In the embodiment, the template image information 15a is information showing pixels forming a contour, the gradient vectors of these pixels, and a pattern within the contour, as shown in FIG. 4.

The template information 15a can vary for each attitude of a three-dimensional model. Therefore, in the embodiment, an attitude is recorded in the recording medium 15 corresponding to the template image information 15a. In the embodiment, the template image information 15a is generated from a three-dimensional model of the object W1. The timing of generating the template image information 15a may be at least before the template image information 15a is used, and may be various timings.

For example, the template image information 15a may be generated in advance based on a three-dimensional model of the object W1, before an operation by the robot 1, image pickup by the camera 20, or a grip operation to grip the object W1 by the robot 1 is started. Also, the template image information 15a may be generated from three-dimensional model data of the object W1 recorded in the recording medium 15, after image pickup by the camera 20 or a grip operation to grip the object W by the robot 1 is started. Moreover, the template image information 15a may be generated in advance corresponding to a plurality of typical attitudes, and after a typical attitude that is the closest to the attitude of the object W1 is specified based on a picked-up image of the object W1, the template image information 15a corresponding to this typical attitude may be generated.

Also, the gradient vectors forming the template image information 15a may be acquired by various methods. For example, after the gradient vectors are acquired in a three-dimensional space based on a three-dimensional model, the gradient vectors may be projected onto a two-dimensional plane. Alternatively, after a three-dimensional model is projected onto a two-dimensional plane, the gradient vectors may be calculated.

The attitude decision unit 10c causes the control device 10 to execute the function of deciding the attitude of the object, based on a template image such that the distance between the pixels forming the contour in the picked-up image and the pixels forming the contour of the template image is shorter than a first threshold and that the degree of similarity between the gradient of the pixels forming the contour in the picked-up image and the gradient of the pixels forming the contour of the template image is higher than a second threshold. That is, the control device 10 extracts a site presumed to be an image of the object W1 from the picked-up image picked up by the camera 20 and acquired by the function of the picked-up image acquisition unit 10a.

The control device 10 also compares this site with the template images acquired by the function of the template image acquisition unit 10b and decides the attitude corresponding to the template image that matches the site most closely, as the attitude of the object W1. To this end, the control device 10 acquires the distance between the pixels of the contour and the gradient of the pixels of the contour. That is, by the function of the attitude decision unit 10c, the control device 10 extracts an edge within the picked-up image and extracts pixels forming the contour of the site presumed to be an image of the object W1. The control device 10 also extracts the pixels forming the contour of the template image. Then, the control device 10 calculates the degree of reliability, which increases with an increase in the number of pixels such that the distance is shorter than the first threshold and that the degree of similarity between gradient vectors is higher than the second threshold (described in detail later).

Of course, if the distance between the camera 20 and the object W1 varies, the size of the image of the object W1 in the picked-up image varies. In order to consider the difference in the size of the image corresponding to the distance between the camera 20 and the object W1, a configuration in which the template image is enlarged or reduced may be employed, or a configuration in which the attitude is regarded as different if the distance between the camera 20 and the object W1 is different and in which a template image corresponding to each distance is prepared in advance may be employed.

In the embodiment, if the degree of reliability is very high, the control device 10 decides that the attitude corresponding to that template image is the attitude of the object. Meanwhile, if the degree of reliability is not very high but not low, the control device 10 verifies whether the template image matches the object image or not, based on another indicator.

That is, by the function of the attitude decision unit 10c, the control device 10 specifies a uniform site in the contour formed in the picked-up image. The uniform site can be specified by various methods. In the embodiment, by the function of the attitude decision unit 10c, the control device 10 specifies pixels that are of an edge and pixels that are not of an edge, in the contour at the site presumed to be an image of the object W1. The control device 10 then regards the site configured of the pixels that are not of an edge, as a uniform site in the contour formed in the picked-up image.

Meanwhile, the control device 10 specifies pixels having a minimum distance from the edge pixels equal to or greater than a prescribed minimum reference value, in the contour of the template image shown by the template image information 15a. The control device 10 also regards these pixels as a uniform site in the contour of the template image. The control device 10 then specifies the rate of coincidence between the uniform site in the contour formed in the picked-up image and the uniform site in the contour of the template image, as a degree of coincidence, and if the degree of coincidence is higher than a predetermined third threshold, the control device 10 regards the attitude corresponding to this template image as appropriate based on the degree of coincidence between the uniform sites (regards the attitude as verified).

If the attitude is regarded as appropriate based on the degree of coincidence between the uniform sites, the control device 10, by the function of the attitude decision unit 10c, changes the position of the template image and acquires the degree of association between each of the template images after the change and the picked-up image. In the embodiment, the degree of association is the degree of similarity between the gradient of the pixels forming the contour in the picked-up image and the gradient of the pixels forming the contour of the template image. That is, the control device 10 changes the position of the template image and acquires the degree of similarity in the gradient with respect to each position after the change.

If the template image matches the object image, the degree of similarity acquired with the template image moved is lower than in the case where the template image does not match the object image. Therefore, there is a high possibility that the template image matches the object image at a position where the degree of similarity has a maximum value. Also, if a proper template image is selected and the template image matches the object image, the degree of similarity has a large value. However, if the template image is moved, the degree of similarity suddenly drops.

Thus, the control device 10 specifies the degree of steepness of distribution of the degree of similarity (distribution of the degree of association), and if the degree of steepness is higher than a fourth threshold, the control device 10 regards the attitude corresponding to this template image as appropriate based on the distribution of the degree of association (regards the attitude as verified). If the attitude is verified as appropriate based on the degree of coincidence between the uniform sites and the distribution of the degree of association, the control device 10 regards the verified template image as the attitude of the object W1.

With the above configuration, since a template image such that the distance between the pixels of the contour in the picked-up image and the pixels of the contour of the template image is short is selected, a template image having a contour similar to the contour of the object image can be selected. Also, since a template image whose contour is formed by pixels having a gradient similar to the gradient of the pixels forming the contour in the picked-up image is selected, a template image that does not match the object image (for example, a template image whose contour shape is similar by accident) can be eliminated.

Since an attitude is associated with each template image, if a template image as described above is selected, the attitude of the object can be easily specified with accuracy.

Therefore, the possibility of occurrence of detection error can be reduced and the possibility of being able to properly detect an object can be improved.

Also, since a template image is verified based on the degree of coincidence between a uniform site in the contour formed in the picked-up image and a uniform site in the contour of the template image, a template image that does not match the object image (for example, a template image whose contour shape is similar by accident and whose contour gradient is similar by accident) can be eliminated. Moreover, since a template image is verified based on the degree of steepness of distribution of the degree of association, a template image that does not match the object image (for example, a template image whose contour shape is similar by accident, whose contour gradient is similar by accident, and whose uniform site in the contour coincides with that of object image by accident) can be eliminated.

The robot control unit 10d causes the control device 10 to execute the function of controlling the robot 1 to operate. That is, the robot 1 is a general-purpose robot capable of carrying out various kinds of work by being taught. The robot 1 has a motor, not illustrated, as an actuator, and an encoder as a sensor 1a. The robot control unit 10d specifies the attitude of each part of the robot 1 based on an output from the sensor 1a, outputs a control signal to the robot 1, and thus can control the robot 1 in such a way that each part of the robot 1 is in a desired attitude.

In the embodiment, the robot 1 can be taught to execute arbitrary work. Also, in the embodiment, the control device 10 can control the robot 1 to detect the attitude of the object W1 and grip the object W1 in this attitude. Therefore, the user in this embodiment need not teach detailed movements (position for gripping or the like) to grip the object W1. Simply by giving an instruction to grip the object W1, the user can cause the robot 1 to grip the object W1 picked up in the image by the camera 20.

(3) Object Attitude Detection Processing

Figure 5:
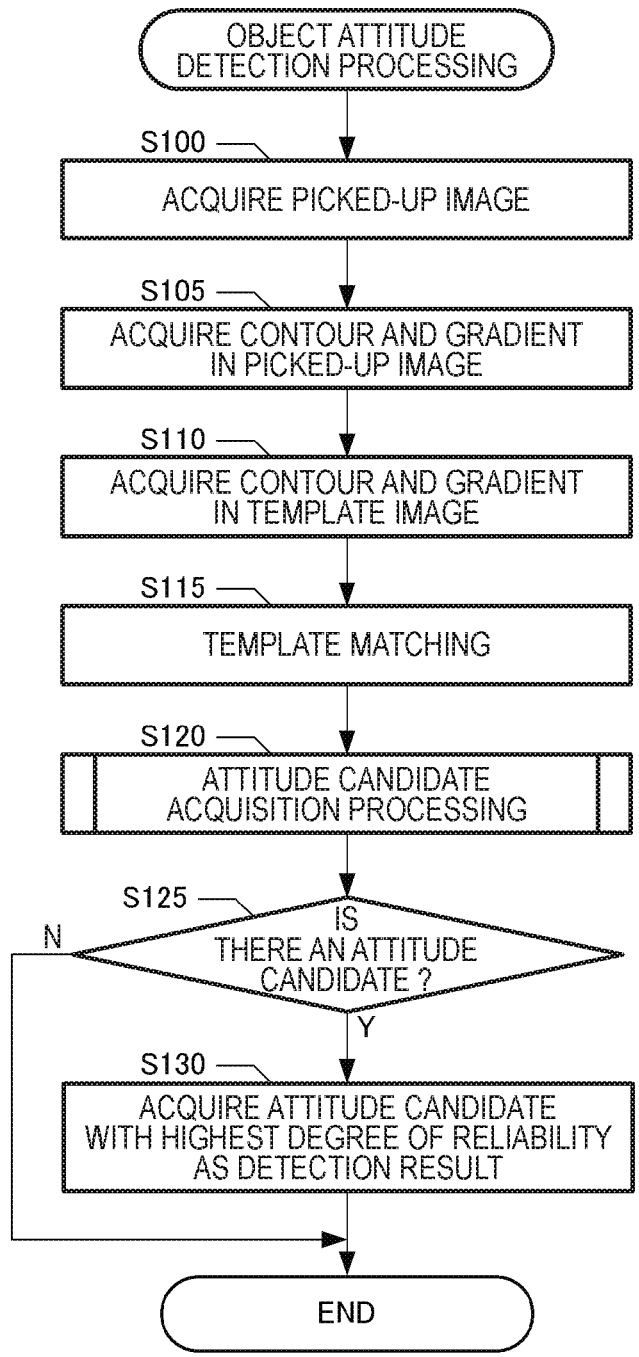
FIG. 5 is a flowchart of object attitude detection processing.
Figure 6:
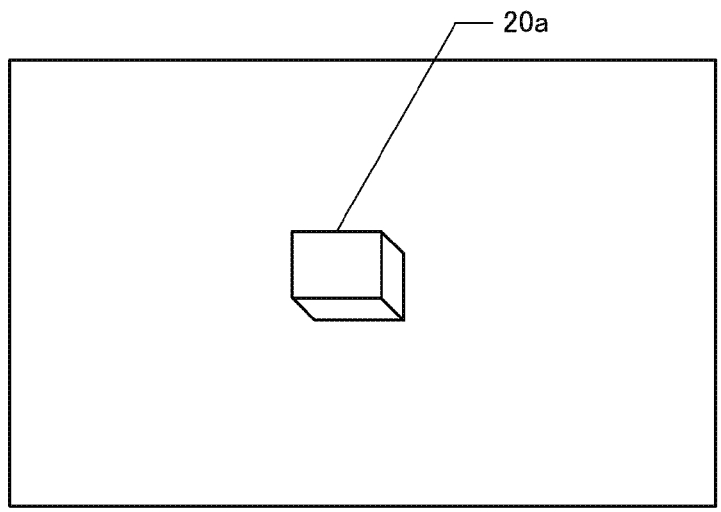
FIG. 6 shows an example of a picked-up image.

Next, object attitude detection processing executed by the control device 10 will be described in detail. FIG. 5 is a flowchart of the object attitude detection processing. The object attitude detection processing is executed in the case where the robot 1 needs to detect the attitude of the object W1. As the object attitude detection processing is started, the control device 10 acquires a picked-up image by the function of the picked-up image acquisition unit 10a (Step S100). That is, the control device 10 controls the camera 20, thus acquires a picked-up image including the object W1, and saves the picked-up image in the RAM. FIG. 6 schematically shows a picked-up image picked up by the camera 20. In FIG. 6, an image 20a of the object W1 is included.

Figure 7:
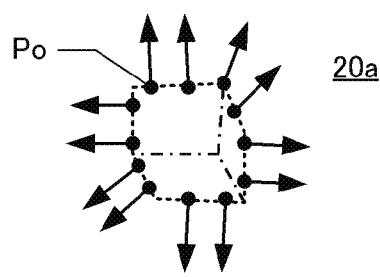
FIG. 7 shows an example of analysis on an image of an object.

Next, the control device 10 acquires a contour and gradient in the picked-up image by the processing of the attitude decision unit 10c (Step S105). That is, the control device 10 causes an edge detection filter to work on the picked-up image saved in the RAM and thus extracts edge pixels. The control device 10 also acquires a site presumed to be the contour of the object W1, based on the edge pixels. This site may be acquired by various kinds of processing. A site where an edge is continuously arranged, forming a closed geometric figure, may be acquired. Also, in a configuration where the object W1 is arranged at a specific site on the camera 20, a specific site in the picked-up image may be acquired. Various configurations can be employed for this. In the example shown in FIG. 6, the outer circumferential line of the image 20a of the object W1 is acquired as the site presumed to be the contour of the object W1. In FIG. 7, the contour acquired from the image 20a of the object W1 shown in FIG. 6 is schematically shown by dashed lines.

After the site presumed to be the contour is acquired, the control device 10 acquires the gradient vectors of the pixels forming the contour. The gradient vectors can be acquired by various methods. For example, a configuration in which the gradient vectors are acquired by applying edge detection filters facing different directions, or the like, can be employed. In FIG. 7, the gradient vectors are indicated by solid lines with arrows. After the pixels forming the contour and the gradient vectors are acquired, the control device 10 extracts N (N being an integer equal to or greater than 2, for example, 100) pixels in such a way that pixels having characteristic gradients in the contour are distributed as evenly as possible in the contour, and regards the extracted pixels as pixels forming the contour.

In FIG. 7, some pixels are indicated by black dots. In Step S105 in the embodiment, a gradient vector is calculated with respect to all the pixels forming the contour, and N pixels are extracted from these pixels and regarded as pixels forming the contour. Such pixels may be extracted by various methods. For example, a configuration in which pixels are extracted in such a way that, if the product of the sum of squares of the distance from the nearest pixel and the magnitude of the gradient is accumulated with respect to N pixels, the accumulated value is maximized, or the like, may be employed.

Next, the control device 10 acquires the contour and gradient in the template image by the processing of the template image acquisition unit 10b (Step S110). That is, the control device 10 refers to the template image information 15a and acquires pixels forming the contour of a template image corresponding to a specific attitude, and the gradient vectors of the pixels.

Next, the control device 10 executes template matching by the processing of the attitude decision unit 10c (Step S115). That is, the control device 10 compares the pixels forming the contour acquired in Step S105 with the pixels forming the contour of the template image acquired in Step S110, and specifies pixels corresponding to each other in the two contours. The corresponding pixels can be specified by various methods. For example, a configuration in which a position of the template image is selected in such a way that the degree of similarity between the gradient vectors of the nearest pixels (inner product of vectors or the like) is maximized and in which the pixels with the maximum degree of similarity are regarded as corresponding pixels, or a configuration in which, in the state where the sum of the distances between pixels is minimized, the nearest pixels are regarded as corresponding pixels, or the like, may be employed.

After the corresponding pixels are acquired, the control device 10 acquires the distance between the corresponding pixels and acquires the sum with respect to all the pixels. For example, in the example shown in FIG. 6, a pixel P and the like forming the contour of the image of the object W1 acquired as shown in FIG. 7, and a pixel Pt and the like forming the contour of the template image shown in FIG. 4 are compared with each other, and the sum of the distances between the nearest pixels is acquired. Then, if the sum is smaller than a reference value, the control device 10 regards the template image as matching the object image.

In this example, it is assumed that the processing of acquiring the contour and gradient in Step S110 is carried out with respect to template images corresponding to all of the attitudes prepared in advance. Therefore, a plurality of template images that can match the object image can be produced. Of course, it is possible to employ a configuration in which the acquisition of the contour and gradient in the template image and the template matching are executed on one template image and in which, if the template image does not match, similar processing is repeated on the other template images. Also, an attitude that matches in the template matching may be changed further based on a three-dimensional model, and an attitude that matches more accurately may be specified.

After one or more template images that match the object image are detected by the template matching, the control device 10 executes attitude candidate acquisition processing by the processing of the attitude decision unit 10c (Step S120). That is, the control device 10 executes the processing of acquiring the degree of reliability indicating the degree to which the template image specified in Step S115 matches the object image, and extracting an attitude with a high degree of reliability as an attitude candidate (described in detail later).

Next, the control device 10 determines whether there is an attitude candidate or not, by the processing of the attitude decision unit 10c (Step S125). If there is an attitude candidate, the control device 10 acquires an attitude candidate with the highest degree of reliability as the result of detection (Step S130). That is, the control device 10 regards the attitude corresponding to the template image with the highest degree of reliability as the attitude of the object W1. If it is not determined that there is an attitude candidate in Step S125, the control device 10 determines that the attitude of the object W1 cannot be detected.

(4) Attitude Candidate Acquisition Processing

Figure 8:
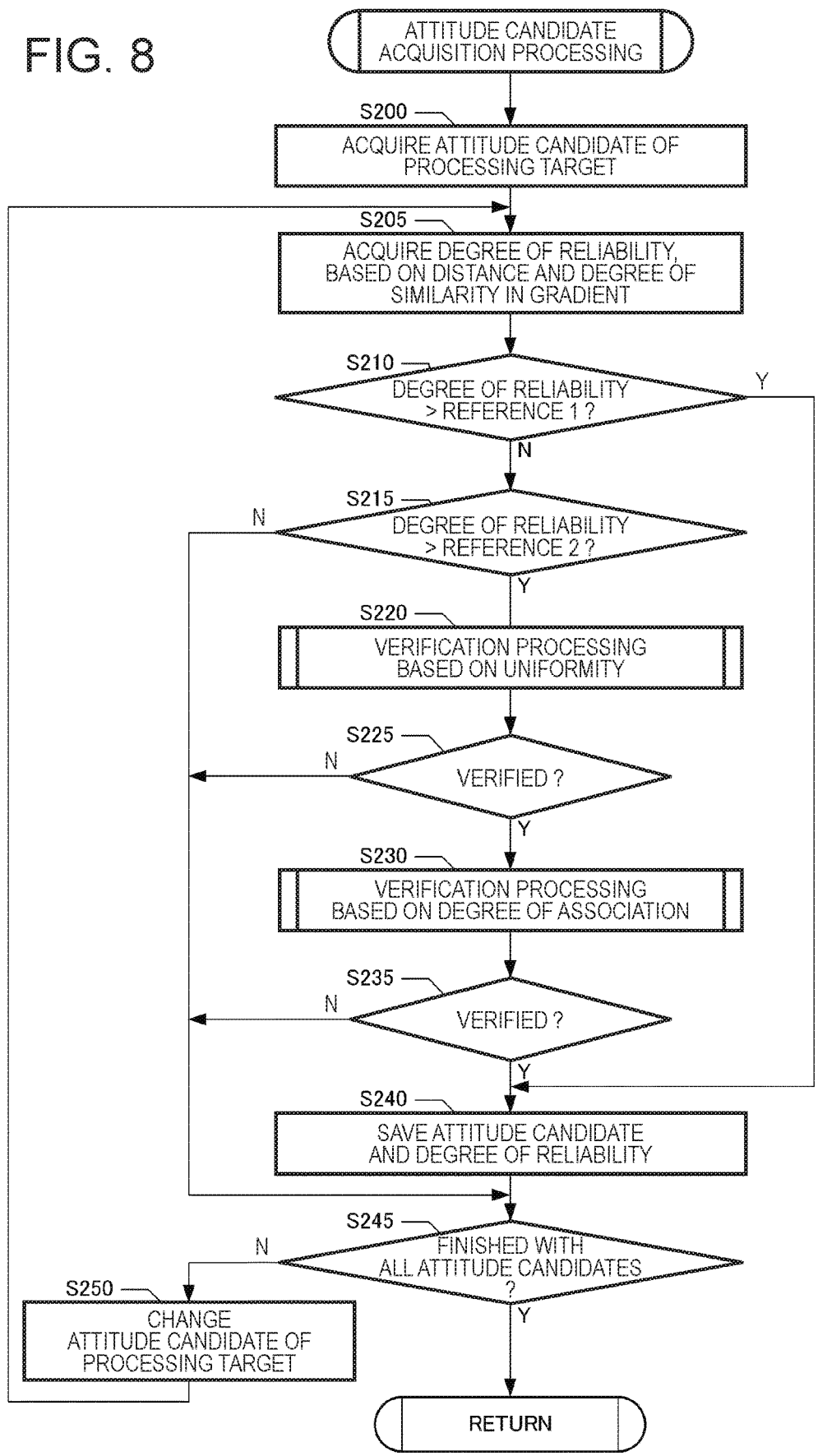
FIG. 8 is a flowchart of attitude candidate acquisition processing.

Next, the attitude candidate acquisition processing executed by the control device 10 will be described in detail. FIG. 8 is a flowchart showing the attitude candidate acquisition processing in Step S120 in FIG. 5. In the attitude candidate acquisition processing, the control device 10 successively carries out processing, selecting one attitude from among all the attitudes corresponding to the template image determined as matching the object image in Step S115, as a processing target. That is, the control device 10 acquires one attitude that is not a processing target in Steps S205 to S245 from among all the attitudes, as an attitude candidate of a processing target (Step S200).

Next, the control device 10 acquires the degree of reliability based on the distance and the degree of similarity in the gradient (Step S205). That is, the control device 10 extracts pixels which form the contour of the image 20a of the object W1 and the contour of the template image corresponding to the attitude candidate of the processing target and which correspond to each other. Then, the control device 10 acquires the distance between the corresponding pixels and the degree of similarity between the gradients of the respective pixels.

Figure 9:
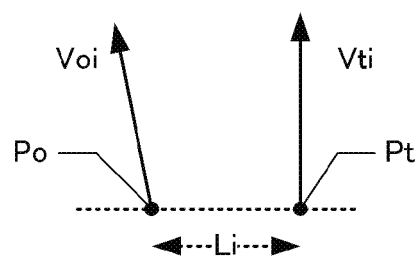
FIG. 9 shows an example of acquisition of the degree of reliability.

FIG. 9 is a schematic view showing, in an enlarged form, the pixel Po forming the contour of the image 20a of the object W1 and the pixel Pt forming the contour of the template image in the case where these pixels correspond to each other. If these pixels correspond to each other, the control device 10 acquires the distance Li between the two pixels. The control device 10 also acquires the inner product of gradient vectors Voi, Vti of the two pixels as the degree of similarity. Then, the control device 10 defines the indicator of the distance with respect to a pixel i, as 1 if the distance Li is shorter than a first threshold and 0 if the distance Li is equal to or longer than the first threshold. Also, the control device 10 defines the indicator of the degree of similarity in the gradient with respect to the pixel i, as 1 if the inner product of the gradient vectors Voi, Vti is greater than a second threshold and 0 if the inner product is equal to or smaller than the second threshold.

In the embodiment, the first threshold is a predetermined fixed value and may be decided, for example, as three pixels. In the embodiment, the second threshold is a variable value and depends on the curvature of the contour of the template image. That is, in the embodiment, the second threshold decreases as the curvature of the contour of the template image increases. If the contours of the object image and the template image steeply change and have a large curvature, as in an image having a jaggy contour, the gradient of the pixels forming the contour changes greatly within a small area. In this case, if the second threshold as the threshold for gradient is reduced, the allowable range of gradient difference is increased and the possibility of regarding the state where an object can be regarded as having been detected, as a non-detected state, can be reduced.

The control device 10 calculates the indicator of the distance and the indicator of the degree of similarity as described above with respect to each pixel, and acquires the degree of reliability based on the sum of these indicators. Specifically, the degree of reliability C is acquired, based on an equation (1).

$$C = \frac{1}{N} \sum_{i=1}^{N} \{[L_i < th_1][|Voi \times Vti| > th_2]\} \quad (1)$$

Here, [ ] is an operator that is 1 if the condition in the brackets is satisfied and 0 if the condition is not satisfied. Also, th1 is the first threshold and th2 is the second threshold. Li is the distance between corresponding pixels. Voi is the gradient vector of the pixel Po forming the contour of the image 20a of the object W1. Vti is the gradient vector of the pixel Pt forming the contour of the template image. The symbol i is the number indicating a set of corresponding pixels. N is the number of pixel sets. The number of pixels for which the distance and gradient vector are acquired in Step S205 may be greater than the number of images acquired in the template matching in Step S115.

After the degree of reliability is acquired based on the template image of the attitude candidate of the processing target, the control device 10 determines whether the degree of reliability is higher than a reference 1 or not (Step S210). In the embodiment, the reference 1 represents a degree of reliability that is high enough to determine that the template image matches the image of the object W1, based on the distance between the corresponding pixels and the gradient vector. Thus, if it is determined that the degree of reliability is higher than the reference 1 in Step S210, the control device 10 saves the attitude candidate and the degree of reliability in the RAM (Step S240).

If it is not determined that the degree of reliability is higher than the reference 1 in Step S210, the control device 10 determines whether the degree of reliability is higher than a reference 2 or not (Step S215). In the embodiment, the reference 2 represents a lower limit value of the degree of reliability. Thus, if it is not determined that the degree of reliability is higher than the reference 2 in Step S215, the control device 10 skips Steps S220 to S240.

Meanwhile, if it is determined that the degree of reliability is higher than the reference 2 in Step S215, the control device 10 executes verification processing based on uniformity (Step S220). That is, the control device 10 verifies whether the template image corresponding to the attitude candidate to be processing target is appropriate or not, based on the degree of coincidence between a uniform site in the contour formed in the picked-up image and a uniform site in the contour of the template image (described in detail later). Next, the control device 10 determines whether the template image is verified or not, by the verification processing based on uniformity (Step S225). If it is not determined that the template image is verified, the control device 10 skips Steps S225 to S240.

If it is determined in Step S225 that the template image is verified by the verification processing based on uniformity, the control device 10 execute verification processing based on the degree of association (Step S230). That is, the control device 10 verifies whether the template image corresponding to the attitude candidate of the processing target is appropriate or not, based on the degree of steepness of distribution of the degree of association (described in detail later). Next, the control device 10 determines whether the template image is verified or not, by the verification processing based on the degree of association (Step S235). If it is not determined that the template image is verified, the control device 10 skips Step S240.

Meanwhile, if it is determined in Step S235 that the template image is verified by the verification processing based on the degree of association, the control device 10 saves the attitude candidate of the processing target and the degree of reliability (Step S240). An attitude is expressed based on a coordinate system (angle and position with respect to coordinate axes). An attitude candidate may be specified based on the coordinate system or may be specified by an ID or the like associated in advance with a predetermined attitude.

If Step S240 is executed, if it is not determined that the degree of reliability is higher than the reference 2 in Step S215, or if it is not determined that the template image is verified in Steps S225, S230, the control device 10 determines whether all the attitude candidates are finished or not (Step S245). That is, the control device 10 determines whether or not processing is finished with all the attitudes corresponding to the template image determined as matching the object image in Step S115.

If it is not determined that all the attitude candidates are finished in Step S245, the control device 10 changes the attitude candidate of the processing target to an unprocessed candidate (Step S250) and repeats the processing from Step S205 onward. If it is determined that all the attitude candidates are finished in Step S245, the control device 10 ends the attitude candidate acquisition processing.

(5) Verification Processing Based on Uniformity

Figure 10:
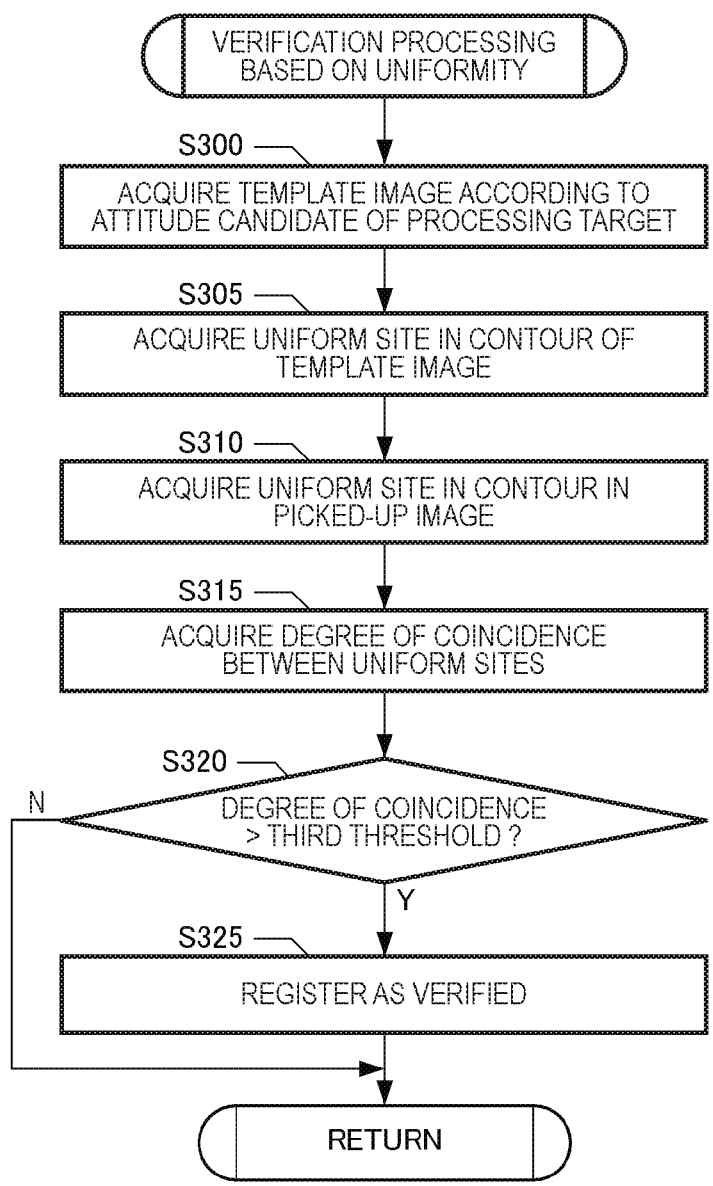
FIG. 10 is a flowchart of verification processing based on uniformity.
Figure 11:
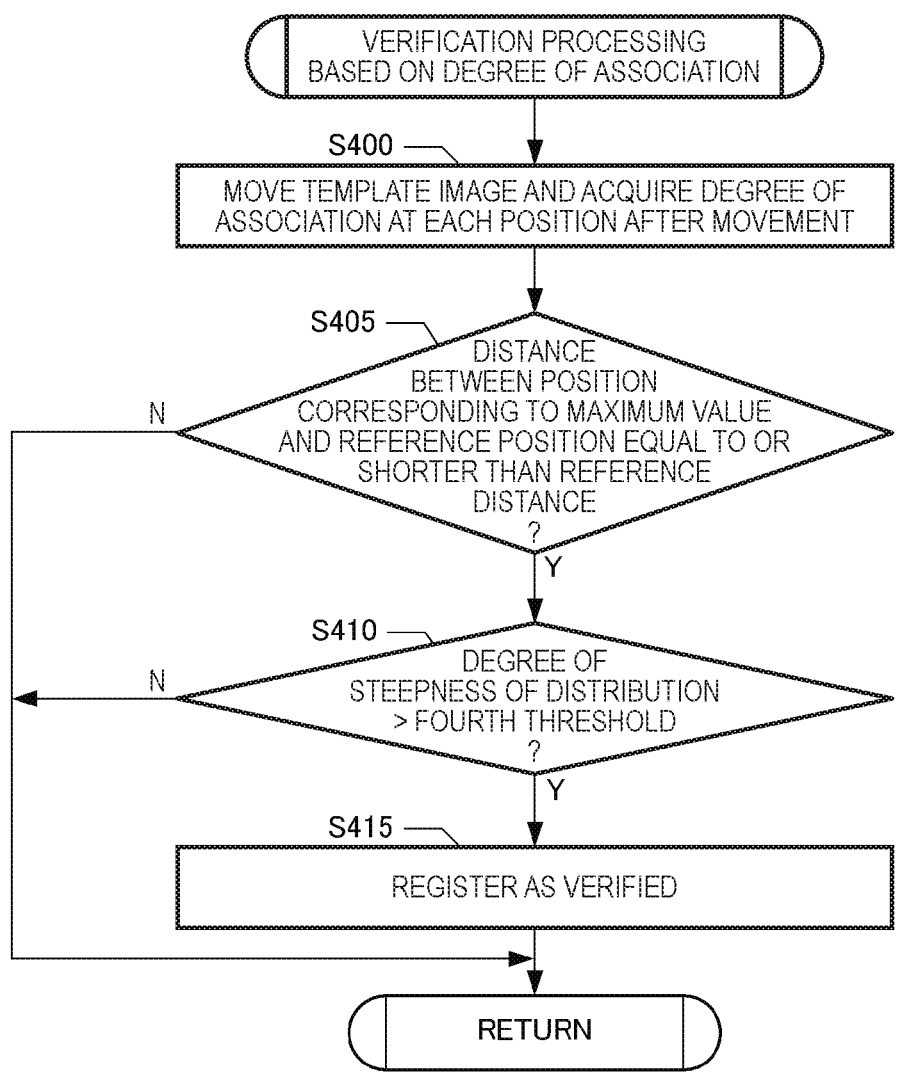
FIG. 11 is a flowchart of verification processed based on the degree of association.

Next, the verification processing based on uniformity executed by the control device 10 will be described in detail. FIG. 10 is a flowchart showing the verification processing based on uniformity in Step S220 in FIG. 8. In the verification processing based on uniformity, the control device 10 acquires the template image according to the attitude candidate of the processing target (Step S300). That is, the control device 10 refers to the template image information 15a and acquires the template image corresponding to the attitude candidate of the processing target.

Next, the control device 10 acquires a uniform site in the contour of the template image (S305). That is, the control device 10 extracts edge pixels from the template image in the state of being projected on a two-dimensional plane. The control device 10 also specifies pixels having a minimum distance to the edge pixels equal to or greater than a prescribed minimum reference value. Moreover, the control device 10 regards the pixels as a uniform site in the contour of the template image. In the embodiment, in order to carry out verification based on a uniform site, a plurality of pixels used for the verification is sampled from the uniform site in the contour of the template image.

In the template image shown in FIG. 4, the sampled pixels are indicated by white dots. With the above configuration, a uniform site can be easily detected from the template image. Also, the uniform site in the contour of the template image may be acquired and included in the template image information 15a in advance.

Next, the control device 10 acquires a uniform site in the contour in the picked-up image (Step S310). That is, the control device 10 applies an edge detection filter to a site presumed to be the image of the object W1 and specifies pixels that are of an edge and pixels that are not of an edge. The control device 10 then regards the site formed by the pixels that are not of an edge, as a uniform site in the contour formed in the picked-up image. In the example shown in FIG. 7, the area surrounded by dashed lines and dot-dashed lines is acquired as a uniform site.

Next, the control device 10 acquires the degree of coincidence between the uniform sites (Step S315). That is, the control device 10 extracts pixels corresponding to the positions of the pixels sampled in Step S305, from the image of the object W1, and determines whether both are uniform sites or not. The control device 10 carries out this determination with respect to each of the sampled pixels and acquires the value of the number of pixels with which both are uniform sites, divided by the number of the sampled pixels, as the degree of coincidence.

Next, the control device 10 determines whether the degree of coincidence is higher than a third threshold or not (Step S320). The third threshold may be set in advance in such a way as to increase the possibility of being able to eliminate the degree of coincidence in the case where the template image and the image of the object W1 are coincident with each other by accident. For example, the third threshold is set to a value such as 70%.

If it is determined that the degree of coincidence is higher than the third threshold in Step S320, the control device 10 registers that the template image is verified by the verification processing based on uniformity (Step S325). That is, the control device 10 records, in the RAM, a flag or the like indicating that verification based on uniformity is carried out on the attitude candidate of the processing target. If it is not determined that the degree of coincidence is higher than the third threshold in Step S320, the control device 10 skips Step S325.

(6) Verification Processing Based on Degree of Association

Next, the verification processing based on the degree of association executed by the control device 10 will be described in detail. FIG. 10 is a flowchart showing the verification processing based on the degree of association in Step S230 in FIG. 8. In the verification processing based on the degree of association, the control device 10 moves the template image and acquires the degree of association at each position after the movement (Step S400). That is, the state where an attitude candidate of the processing target is specified is the state where the template image is at a specific relative position to the image of the object W1. In Step S400, the control device 10 relatively moves the template image, using the position of the template image in this state as a reference position.

Figure 12:
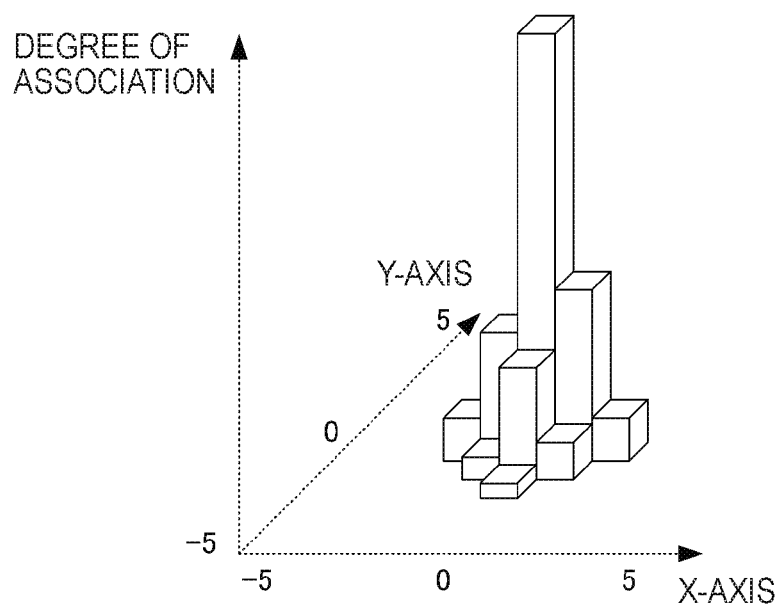
FIG. 12 shows distribution of the degree of association.

In the embodiment, the control device 10 moves the template image within a predetermined range from the reference position at its center, into the positive and negative directions along each coordinate axis of the image of the object W1. FIG. 12 shows an example of the degree of association. In FIG. 12, the coordinate axes showing the position of the image of the object W1 are denoted as X-axis and Y-axis, and the magnitude of the degree of association is shown on an axis perpendicular to the X-axis and the Y-axis.

Also, in FIG. 12, the degree of association corresponding to the reference position is shown at the position of (X, Y)=(0, 0) and a range of ±5 in the X-axis direction and ±5 in the Y-axis direction is the relative movement range of the template image. The position of the template image is changed within this relative movement range and the degree of association between each of the template images after the change and the picked-up image is acquired and plotted as a bar chart. In the embodiment, the degree of association is the degree of similarity between the gradient of the pixels forming the contour in the picked-up image and the gradient of the pixels forming the contour of the template image.

That is, the control device 10 acquires the degree of similarity in gradient between the pixels forming the contour of the image 20a of the object W1 and the pixels forming the contour of the template image, as in Step S205. The control device 10 then acquires the total sum of the degrees of similarity in gradient with respect to the respective pixels and regards the total sum as the degree of association corresponding to the position of this template image. The control device 10 carries out the processing of acquiring the degree of association as described above, with respect to each of the template images after the position change.

As the degree of association is defined by the degree of similarity in gradient, as described above, the degree of association is high if the position of the template image matches the image of the object W1, whereas the degree of association suddenly becomes low if the position of the template image does not match the image of the object W1. Therefore, by analyzing the distribution of the degree of association, it is possible to verify the position of the template image.

Specifically, the control device 10 determines whether the distance between the position corresponding to the maximum value and the reference position is equal to or shorter than a reference distance, or not (Step S405). That is, the control device 10 refers to the distribution of the degree of association acquired in Step S400 and acquires the position of the template image where the degree of association is at the maximum value (relative position of the template image to the image of the object W1). The control device 10 also acquires the distance between the position where the degree of association is at the maximum value and the reference position, and determines whether the distance is equal to or shorter than a predetermined reference distance, or not. The reference distance is a threshold for determining whether the relative position of the template image corresponding to the attitude candidate of the processing target is close enough to be regarded as matching the image of the object W1 or not. The reference distance is decided in advance.

If it is not determined in Step S405 that the distance between the position corresponding to the maximum value and the reference position is equal to or shorter than the reference distance, the control device 10 skips Steps S410, S415. That is, the template image is regarded as not verified based on the degree of association. Meanwhile, if it is determined in Step S405 that the distance between the position corresponding to the maximum value and the reference position is equal to or shorter than the reference distance, the control device 10 determines whether the degree of steepness of the distribution is higher than a fourth threshold or not (Step S410). The fourth threshold is an indicator for determining whether the degree of association steeply drops at positions other than the reference position or not.

That is, if the degree of association steeply drops because the relative position shifts from the reference position, it is clear that the possibility that the template image at the reference position matches the image of the object W1 is high and that the possibility that the template image at other positions matches the image of the object W1 is low. Thus, in the embodiment, the fourth threshold is defined in advance with respect to the degree of steepness of the distribution of the degree of association. The degree of steepness can be defined in various forms. In the embodiment, the maximum value of the degree of association divided by the minimum value is the degree of steepness.

If it is determined that the degree of steepness of the distribution is higher than the fourth threshold in Step S410, the control device 10 registers that the template image is verified by the verification processing based on the degree of association (Step S415). That is, the control device 10 records, in the RAM, a flag or the like indicating that verification based on the degree of association is carried out on the attitude candidate of the processing target. If it is not determined in Step S410 that the degree of steepness of the distribution is higher than the fourth threshold, the control device 10 skips Step S415.

(7) Other Embodiments

The above embodiment is an example for carrying out the invention and various other embodiments can be employed. For example, the control device may be built in the robot or may be provided in a place that is different from the place where the robot is installed, for example, in an external server. The control device may also be configured of a plurality of devices. The control device may also be a robot controller, a teach pendant, a PC, a server connected to a network, or the like, or may include these. Moreover, a part of the configuration in the embodiment may be omitted and the order of the processing may be changed or partly omitted. For example, in the processing shown in FIG. 8, at least one of the determination based on the degree of reliability in Steps S205 to S215, the determination based on uniformity in Steps S220 and S225, and the determination based on the degree of association in Steps S230 and S235 may be omitted and the order of the processing may be changed.

The picked-up image acquisition unit may employ any form of image pickup, provided that it can acquire a picked-up image of an object. For example, image pickup may be carried out by a camera attached to the robot, or an image of the object may be picked up by a camera other than a camera used together with the robot. As the latter case, a configuration in which an image of the object is picked up by a camera installed at an arbitrary position (for example, a camera installed on a vehicle), or the like, may be employed. Also, a detection target object is a known object and its size and shape are not limited. That is, as long as a template image corresponding to each attitude can be generated in advance, an arbitrary object can be used as the detection target object.

It suffices that the template image acquisition unit can acquire a template image corresponding to each attitude of an object. That is, it suffices that images of the object picked up in various attitudes are used as template images in advance and that the object, when matching a certain template image, can be regarded as being in the attitude corresponding to this template image.

It suffices that the template image shows an image in which a detection target object is picked up. The template image may be generated from a 3D model as described above or may be the result of picking up images of the object in a plurality of attitudes. Also, it suffices that at least pixels of the contour and the gradient of the contour are defined in the template image. Information about the contour may be defined and information about the inside of the contour may be included. Information about the outside of the contour of the template image need not be included and need not exist, either, and may be configured of pixels of a predetermined gradation level.

A change in the size of an object within an image (position of the object in the direction of the optical axis of the camera) may be detected by having template images of different sizes prepared in advance, or may be detected by having a template image of a specified size enlarged or reduced. Various configurations can be employed for this. Also, the attitude may be any attitude relative to a specific reference (for example, the camera) and may be defined on various coordinate systems. Of course, the attitude may include the position of the object.

It suffices that the attitude decision unit can decide the attitude of an object, based on a template image such that the distance between pixels forming the contour in a picked-up image and pixels forming the contour of the template image is shorter than the first threshold and that the degree of similarity between the gradient of the pixels forming the contour in the picked-up image and the gradient of the pixels forming the contour of the template image is higher than the second threshold. That is, it suffices that the attitude decision unit can decide whether the template matches the image of the object or not, based on the conditions that the distance between the contour of a candidate image of the object and the contour of the template image is short and that the gradient of the contour of the candidate image of the object and the gradient of the contour of the template image are similar to each other.

The pixels forming the contour in the picked-up image may be any pixels that can be of an outer circumferential part of the object. A configuration in which edge pixels detected by an edge detection filter are regarded as the contour as in the embodiment may be employed. Also, at a site where edge pixels continue over a predetermined length, these edge pixels may be regarded as the contour. If edge pixels form a closed geometric figure, these edge pixels may be regarded as the contour. Various configurations can be employed.

The distance between the pixels forming the contour in the picked-up image and the pixels forming the contour of the template image may be any indicator for evaluating the degree of coincidence, the degree of overlap or the like between the two contours. The distance between the corresponding pixels in the two contours may be measured or the shortest distance between the pixels forming the two contours may be measured. Various configurations can be employed for this. The number of pixels sampled to evaluate the distance is not limited. Various values or the like can be employed.

The first threshold may be defined in advance as a value that can eliminate the state where the contour formed in the picked-up image does not match the contour of the template image. The first threshold may be a fixed value or a variable value. Also, the first threshold may change according to the number of pixels sampled to measure the distance between pixels.

The gradient is detected by various filters or the like as in the embodiment and may be vector information having magnitude and direction or may be one of magnitude and direction. The degree of similarity in gradient may be any indicator such that the degree of similarity becomes higher as the gradients become closer to each other. If the degree of similarity is expressed by a numerical value, a greater numerical value may express a higher degree of similarity, or a smaller numerical value may express a higher degree of similarity.

Also, the degree of similarity may be expressed by the inner product of gradient vectors as in the embodiment, or may be expressed by the degree of coincidence in the magnitude of gradient. The degree of similarity may also be expressed by the angle between the gradient vectors or the distance between the gradient vectors. The second threshold may be defined in advance as any value that can eliminate the state where the gradient of the contour formed in the picked-up image does not match the gradient of the contour of the template image. The second threshold may be a fixed value or a variable value. As a variable value, a configuration in which the second threshold becomes smaller as the curvature of the contour of the template image becomes greater may be employed as in the embodiment.

In the embodiment, a uniform site in the contour formed in the picked-up image is pixels having a minimum distance to the edge equal to or greater than a minimum reference value. However, a uniform site may be specified by various other methods than this configuration. For example, a site where the gradation level of pixels has a change within a predetermined range may be specified as a uniform site. In any case, if a uniform site is specified, template matching can be carried out based on a site with little change in the image, instead of a complex site (edge or contour) in the image.

The degree of coincidence may be defined by the rate of coincidence between the pixels specified as a uniform site in the picked-up image and those in the template image, as in the embodiment, or may be defined by other methods. For example, the degree of coincidence may be defined by the rate of two-dimensional overlap between the uniform sites. Also, the number of sites detected as uniform sites may be measured and the number of coincident or overlapping sites may be evaluated. The third threshold may be defined in advance as any value that can eliminate the state where the uniform site in the contour formed in the picked-up image and the uniform site in the contour of the template image do not coincide with each other. The third threshold may be a fixed value or a variable value.

The degree of steepness of the distribution of the degree of association may be evaluated based on the ratio of the minimum value to the maximum value as in the embodiment or may be evaluated based on other indicators, for example, variance or standard deviation. The degree of association between each of the template images after movement and the picked-up image can be defined by various values other than the degree of similarity in gradient. That is, the degree of association may be defined in such a way that the degree of association changes according to the relative positions of the template image and the picked-up image and that the degree of association rises if the template image matches the position of the object in the picked-up image. Of course, the analysis of the degree of association may be carried out based on elements other than the degree of steepness of the distribution, for example, the distance between the position where the degree of association is at the maximum value and the reference position, as described above, or an indicator based on the distribution shape or the like of the degree of association.

The degree of association may be, for example, the degree of correlation between a value calculated based on the picked-up image and a value calculated based on the template image. That is, if a characteristic that can be defined for each position in the picked-up image and a characteristic that can be defined for each position in the template image are correlated with each other, it is possible to determine whether the template image matches the image of the object W1 or not, by calculating the degree of correlation expressing this correlation.

Such a characteristic may be, for example, a characteristic about the surface structure of the object. More specifically, in an object having planes such as a hexahedron, if reflection from a plane is diffuse reflection such as Lambertian reflection, an image on the same plane can be uniform and shade can vary from one attitude to another of the plane. Meanwhile, if a normal vector on a plane is defined in a three-dimensional model, this normal vector is directed in a predetermined direction within the same plane.

Thus, if the normal vector is projected onto a two-dimensional plane and defined as a characteristic corresponding each pixel and the luminance in the image of the of the object W1 is defined as a characteristic corresponding to each pixel, the degree of correlation between these characteristics corresponding to each pixel can be regarded as the degree of association between the template image and the picked-up image. The degree of correlation can be calculated by various methods. A configuration in which the degree of correlation is acquired based on the correlation coefficient of each characteristic corresponding to each pixel, or the like, can be employed. With this configuration, it is possible to verify whether the template image matches the picked-up image, based on various characteristics of the picked-up image and the template image, and improve the possibility of being able to properly detect the object.

The entire disclosure of Japanese Patent Application No. 2017-064549, filed Mar. 29, 2017 is expressly incorporated by reference herein.

What is claimed is:

1. An object attitude detection device comprising:
a processor that is configured to execute computer-executable instructions so as to detect an attitude of an object,
a pick-up image acquisition unit which acquires a picked-up image of an object;
a template image acquisition unit which acquires a template image for each attitude of the object; and
an attitude decision unit which decides an attitude of the object,
wherein the processor is configured to:
cause the pick-up image acquisition unit to send the picked-up image to the attitude decision unit;
cause the template image acquisition unit to send the template to the attitude decision unit;
cause the attitude decision unit to decide the attitude of the object based on the template image which has pixels wherein,
a distance between pixels forming a contour in the picked-up image and pixels forming a contour of the template image is shorter than a first threshold, and
a degree of similarity between a gradient of the pixels forming the contour in the picked-up image and a gradient of the pixels forming the contour of the template image is higher than a second threshold.

2. The object attitude detection device according to claim 1, wherein
the second threshold becomes smaller as a curvature of the contour of the template image becomes greater.

3. The object attitude detection device according to claim 1, wherein
the attitude decision unit decides the attitude of the object, based on the template image wherein a degree of coincidence between a uniform site in the contour formed in the picked-up image and a uniform site in the contour of the template image is higher than a third threshold.

4. The object attitude detection device according to claim 3, wherein
the uniform site is configured of pixels having a minimum distance to an edge equal to or greater than a minimum reference value.

5. The object attitude detection device according to claim 1, wherein
the attitude decision unit
changes a position of the template image and acquires a degree of association between each of the template images after the change and the picked-up image, and
decides the attitude of the object, based on the template image wherein a degree of steepness of distribution of the degree of association is higher than a fourth threshold.

6. The object attitude detection device according to claim 5, wherein
the degree of association is a degree of similarity between the gradient of the pixels forming the contour in the picked-up image and the gradient of the pixels forming the contour of the template image.

7. The object attitude detection device according to claim 5, wherein
the degree of association is a degree of correlation between a value calculated based on the picked-up image and a value calculated based on the template image.

8. A control device controlling a robot, based on the attitude of the object detected by the object attitude detection device according to claim 1.

9. A control device controlling a robot, based on the attitude of the object detected by the object attitude detection device according to claim 2.

10. A control device controlling a robot, based on the attitude of the object detected by the object attitude detection device according to claim 3.

11. A control device controlling a robot, based on the attitude of the object detected by the object attitude detection device according to claim 4.

12. A control device controlling a robot, based on the attitude of the object detected by the object attitude detection device according to claim 5.

13. A control device controlling a robot, based on the attitude of the object detected by the object attitude detection device according to claim 6.

14. A control device controlling a robot, based on the attitude of the object detected by the object attitude detection device according to claim 7.

15. A robot system comprising:
a robot;
an image pickup device which picks up an image of an object; and
a robot controller comprising:
a processor that is configured to execute computer-executable instructions so as to detect an attitude of an object,
a pick-up image acquisition unit which acquires a picked-up image picked up by the image pickup device;
a template image acquisition unit which acquires a template image for each attitude of the object;
an attitude decision unit which decides an attitude of the object; and
a control unit which controls the robot based on the attitude of the object decided by the attitude decision unit,
wherein the processor is configured to:
cause the pick-up image acquisition unit to send the picked-up image to the attitude decision unit;
cause the template image acquisition unit to send the template to the attitude decision unit;
cause the attitude decision unit to decide the attitude of the object based on the template image which has pixels wherein,
a distance between pixels forming a contour in the picked-up image and pixels forming a contour of the template image is shorter than a first threshold, and
a degree of similarity between a gradient of the pixels forming the contour in the picked-up image and a gradient of the pixels forming the contour of the template image is higher than a second threshold.

16. The robot system according to claim 15, wherein
the second threshold becomes smaller as a curvature of the contour of the template image becomes greater.

17. The robot system according to claim 15, wherein
the attitude decision unit decides the attitude of the object, based on the template image wherein a degree of coincidence between a uniform site in the contour formed in the picked-up image and a uniform site in the contour of the template image is higher than a third threshold.

18. The robot system according to claim 15, wherein
the uniform site is configured of pixels having a minimum distance to an edge equal to or greater than a minimum reference value.

19. The robot system according to claim 15, wherein
the attitude decision unit
changes a position of the template image and acquires a degree of association between each of the template images after the change and the picked-up image, and
decides the attitude of the object, based on the template image wherein a degree of steepness of distribution of the degree of association is higher than a fourth threshold.

20. The robot system according to claim 15, wherein
the degree of association is a degree of similarity between the gradient of the pixels forming the contour in the picked-up image and the gradient of the pixels forming the contour of the template image.

* * * * *